July 14, 1931.  E. MOSS  1,814,485
PIE MAKING PROCESS
Filed April 18, 1931
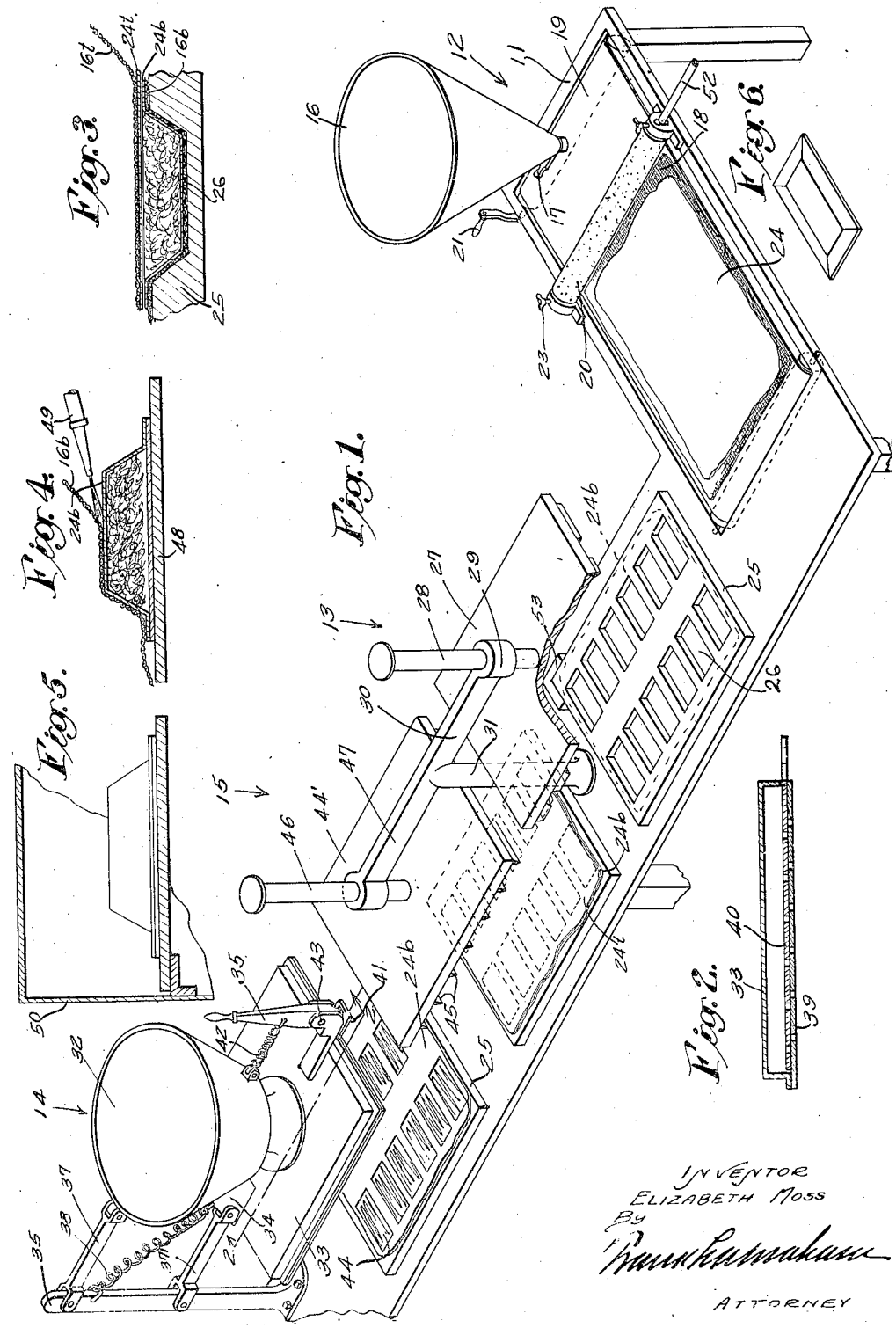

Patented July 14, 1931

1,814,485

UNITED STATES PATENT OFFICE

ELIZABETH MOSS, OF LOS ANGELES, CALIFORNIA

PIE MAKING PROCESS

Substitute for abandoned application Serial No. 130,834, filed August 23, 1926. This application filed April 18, 1931. Serial No. 531,212.

Although this invention is entitled somewhat broadly, it may be understood to relate more particularly to the protection of so-called individual pies; and it is an object of my invention to provide means and methods favorable to the production of very thin and superior pie crusts.

It is a further object of my invention to provide means and methods suitable for the quantity production of individual pies, preferred embodiments of my invention being such as to obviate the use of excessive quantities of grease, flour or the like, in preventing the adhesion of dough to a roller, a rolling board, or the like.

It is a further object of my invention to provide means and methods favorable to the baking of pies in an unusual manner, the larger crust, which serves to provide a concavity for the pie filling, being disposed in an upper position, and no baking tins being required subsequently to the insertion of my pies in an oven.

Other objects of my invention, including the use of improved means and methods for producing very thin sheets of dough and handling the same, and including also novel means for producing the depressions in such sheets of dough, and also means for filling said depressions, and means and methods for trimming and separating pies, a fabric or fabrics being left adherent to one or both of the crusts of a pie during several of the mentioned steps, may be best appreciated from the following description, taken in connection with the appended claims and the accompanying drawings, in which Fig. 1 is a general perspective view, illustrating, somewhat diagrammatically, various features of an apparatus suitable for use in the production of batches of individual pies.

Fig. 2 is a detail view, taken on a vertical plane, as indicated by the line 2—2 of Fig. 1.

Figs. 3 to 5 inclusive are diagrammatical views illustrating various steps or stages in the production of pies in accordance with the principles of my invention.

Fig. 6 shows a finished pie.

This application is a substitute for my forfeited case, Ser. No. 130,834, filed Aug. 23, 1926.

Referring to the details of that specific embodiment of my invention illustrated in Figs. 1 and 2, 11 may be an L-shaped bench or table equipped with (1) a dough-rolling apparatus indicated at 12, (2) a depression-forming or molding apparatus indicated at 13, (3) a filling apparatus indicated at 14, and (4) a trimming and/or subdividing apparatus indicated at 15,—the respective devices to which the characters 12, 13, 14 and 15 are applied being intended to indicate the successive steps of my improved method, rather than to illustrate essential features of mechanical construction.

Referring to the dough-rolling apparatus at 12, this is shown as disposed below a dough-hopper 16, having an open top for the reception of any preferred crust-dough mixture and provided with a cut-off or valve, of any usual or preferred type, operable by a handle 17; and the hopper 16, or its equivalent, may be so positioned as to drop a predetermined quantity of dough upon a lower fabric, or successive rectangles of lower fabric 18, advanced by any suitable means (as by endless web 19,) constantly driven beneath a roller 20, or its equivalent, in any suitable way; as by means of a motor (not shown) controlled by a crank or clutch lever 21; and, after a suitable quantity of dough has been delivered onto a lower sheet or fabric 18 (so-called cheese cloth being a suitable material in this connection) a second and upper sheet (not shown) of the same or similar material may be disposed on top of the dough, in advance of its passage beneath the roller 20, or the like, the result of the indicated rolling operation (the pressure thereof being regulated by screws 23, or the like) being the formation of a comparatively thin and extensive sheet of dough 24 disposed between layers of fabric and advanced to a position favorable to its removal from the endless web 19, or the like, the use of an upper fabric being optional.

Although any desired number of like sheets of dough, similarly disposed between parallel sheets of cheese cloth, or the like, may be run through the described rolling organization in a consecutive manner and piled one upon another, in readiness for subsequent operations, the sheets so delivered may, if desired, be immediately subjected to a molding operation by means of the general character illustrated at 13 as comprising a lower or negative molding plate 25, provided with a depression or depressions 26 corresponding in size to the intended dimensions of a pie, means such as an upper or positive mold member 27, carried by a slidable handle 28 extending through a guide 29 (supported by an arm 30 laterally projecting from an upright 31 and employed manually or otherwise to depress the upper mold member 27 relatively to the lower mold member 25) being used to form concavities in an interposed sheet of dough rolled to a desired thickness (as, to a thickness of one-eighth of an inch more or less) and interposed between said mold members.

In positioning each sheet of dough between a pair of cooperating mold members of the character described, the mentioned sheets of textile material, although provided primarily for the purpose of preventing adhesion of dough to the roller 20, and/or to the web 19 (or to other porous or non-porous members employed in spreading the dough into a thin sheet) may be advantageously utilized to reduce risk of tearing an unusually thin sheet of dough, the upper layer of fabric being presumably withdrawn in advance of the molding operation. At least, it obviously must be removed in advance of a filling operation, such as that for which the apparatus 14 is intended.

The filling apparatus last referred to may comprise a filling hopper 32 supported above a discharge box or multiple nozzle 33, this being shown as rigidly connected with a bracket 34 and as provided with an operating lever 35. In order to permit the nozzle 33 to be elevated and depressed relatively to a plate 25 (assuming the formed dough to be supported thereby during a filling operation) I may secure the bracket 34, or its equivalent, to a standard 35, or the like, by means such as parallel links 37 and 37'; and I may employ resilient means, such as a tension spring 38, normally to hold the discharge box 33 (whether or not the hopper 32 is supported thereby and removable therewith) in an elevated position.

In order that a single lever or handle, such as the mentioned lever 35, may be used not only to depress the discharge box 33 to a suitable level relatively to a molded sheet of dough, but also to control the outflow of a selected fluent pie filling from the hopper 32 (the discharge box 33 being shown as provided with an apertured bottom 39 above which extends a correspondingly apertured slidable valve plate 40, and the lever 35 being shown as provided with a downward extension 41 to engage a slot in said valve plate) I may interpose between the handle 35 and the hopper 32, or between members similarly related, resilient means such as a tension spring 42, more powerful than the mentioned spring 38, the construction and arrangement of the parts referred to being such that whenever downward pressure is applied to the lever 35, the distributing box 33 is first depressed, by an overcoming of the tension spring 38, the lever 35 being permitted to move rotatively upon horizontal pivot 43, to impart sliding movement to the valve plate 40, only after the completion of the mentioned downward movement of said distributing box.

Subsequent to the molding and filling of a "lower" crust in the described manner, or in any described manner, an additional layer of dough or crust material similarly rolled, and deprived of one of the associated layers of fabric, (in case two layers have been employed in rolling the same) may be spread upon the molded and filled layer; and the remaining (upper) fabric layer may be stripped from that added sheet of dough, substantially as suggested in Fig. 3, in advance of a trimming and/or subdividing operation such as that to which the apparatus 15 is suitable.

The convex and larger crust of a pie, commonly baked in contact with a pie tin, being currently referred to as a "bottom" crust, in order to avoid confusion in terminology, I will herein refer to that crust which is subjected to the described molding and filling operations as a "bottom" crust, notwithstanding the fact that some of the operations which remain to be described may be, and preferably are, executed with the convex and larger crusts of pies upwardly disposed; and for convenience of identification, I will apply the characters 16b and 16t to the respective textile sheets, or the like, which initially underlie a "bottom" sheet of dough 24b and a "top" sheet of dough 24t, regardless of the final reversal of the relationship between these sheets.

Fillings 44 having been provided within depressions in the bottom crusts in the described manner, or in any preferred manner, and a top crust 24t having been spread thereon, upon the removal of the fabric 16t (each mold plate 25 being optionally used in supporting a plurality of pies during successive operations of the general character referred to) a completed pie or pies may be trimmed and/or sealed and/or subdivided; and, for this purpose, successive mold plates 25, with pies therein, may be disposed beneath a reciprocable or other cutter 44', carrying a knife or knives 45. In the illustrated embodiment of my invention, the cutter 44' is rigidly secured to a vertically slidable rod or handle 46, supported by an arm 47, carried by the mentioned upright 31, (also supporting molding devices above described); and the depression of the cutter 44' may be effective not only to trim a pie but to separate a plurality of pies, in case my invention is employed in the production of so-called individual pies, and to seal the edges thereof.

Subsequently to the described trimming and/or subdividing operation, I may dispose a metallic plate 48, or the like, above a pie or pies, inverting the same so that the "bottom" curst occupies an upper position, as diagrammatically indicated in Fig. 4; and I may then strip the fabric 24b, if left adherent up to this time, from the bottom of the pie or pies.

In case cooling is to be provided for in advance of baking, I may employ a jet of cold air, as suggested by the showing of a nozzle 49 in Fig. 4, as an aid in stripping the fabric 24b from pies, or I may, regardless of the method by which such stripping is effected, chill the pie or pies in any known or preferred manner, before baking the same.

It is an important merit of the described method of operation that it permits the use of very thin pie crusts, and that it facilitates the disposal of pies in an inverted position, one of the important features of my invention being the fact that I provide for the baking of pies with their "bottom" crusts upwardly disposed. That is to say, optionally carrying the same through a trimming and/or stripping operation while disposed upon the metallic or other plates 48, I may leave the pies upon these same plates during baking operation effected, as suggested in Fig. 5, with the "bottoms" or larger crusts thereof upwardly disposed, this disposal of pies, during baking in an oven 50 and/or during removal from a supporting surface being reliably effective to produce a superior "bottom" crust and to obviate risk of damage or breakage during the removal of a pie from its support.

Although I have above suggested the use of a plurality of sheets or pieces of cheese cloth or the like, as providing a porous member readily separable from a thin layer of pie crust, I may mention that, instead of, or in addition to, one or both of the described sheets, I may employ another porous member such as an earthenware plate and/or roller; and, in the latter case, I may advantageously force air at a moderate pressure through the earthenware surface; and, even though I employ a plurality of sheets of textile material, I may optionally employ such earthenware surfaces thereabove and/or therebelow. For example, as suggested in Fig. 1, I may form the roller 20 of earthenware, admitting air, at a desired temperature, to an interior chamber therein by means such as a compressed air pipe 52; and, depending upon the character and condition of the dough employed, this use of a porous roller 20 may obviate the necessity for the use of at least the upper layers of fabric 22.

The mode of operation of the respective parts of my described apparatus having been fully indicated above, I may emphasize, in conclusion, that the principal features of my invention are capable of execution by a great variety of alternate means, and that my novel means and methods for producing and handling thin sheets of dough enable me to forego the use of undue quantities of flour and/or grease, either in the rolling operation or in other and subsequent operations, such as filling and/or baking operations; and that, the quality of the dough being thus subject to no unfavorable additions, both crusts being thin and "bottom" crusts being baked to unusual perfection, the results are especially attractive.

Instead of relying entirely upon the manual positioning of the molding plates 25 (preferably with the use of fixed guide corners, as suggested at 53) I obviously might employ automatic means not only for advancing the dough, but for manipulating the dough and/or for the operation of filling and/or cutting means, and/or for the advancing of the molding plates 25 or the equivalent, but illustration of additional mechanical means is omitted from my present application as immaterial to the process invention upon which protection is herein sought.

Although I have herein described a single complete embodiment of my invention, it should be understood not only that various features thereof might be independently used but also that numerous modifications might be made, by those skilled in the art to which this case relates, without the slightest departure from the spirit and scope of this invention, as the same is indicated above and in the following claims.

For example, although I herein disclose pies whose bases are rectangular (the length preferably exceeding the breadth thereof, as shown in Fig. 6, the sides and ends being upwardly convergent, and the larger crust being uppermost and hardest baked), it should be understood that the shape and size as well as the crust and filling materials of my pies may be varied within considerable limits. The described shape of the article is, however, favorable to a retention of the filling therein when the latter is somewhat fluent in final consistency, and the consumer is enabled to hold the pie easily while eating it in successive bites, from one end to the other, each mouthful having a proper proportion of crust and filling.

I claim as my invention:

1. A method of producing pies which comprises forming masses of crust dough into thin sheets in contact with a flexible porous member; and molding a lower crust sheet of dough while said porous member remains adherent thereto.

2. A method of producing pies which comprises forming masses of crust dough into thin sheets in contact with flexible porous members; and molding and filling one of said sheets of dough while one of said porous members remains adherent thereto.

3. A method of producing pies which comprises forming masses of crust dough into thin sheets in contact with flexible porous members; molding a lower crust sheet of dough while one of said porous members remains adherent thereto; placing a filler in said molded sheet; and applying thereon an upper crust sheet of dough, to form a complete pie, while one of said porous members remains in contact with said upper sheet of dough.

4. A method of producing pies which comprises forming masses of crust dough into thin sheets in contact with flexible porous members; molding a lower crust sheet of dough while one of said porous members remains adherent thereto; placing a filler in said lower crust; applying thereon an upper crust sheet of dough, to form a complete pie, while one of said porous members remains in contact with said upper sheet of dough; and separating said last-mentioned porous member from said upper sheet of dough in advance of a trimming operation.

5. A method of producing pies which comprises forming masses of crust dough into thin sheets in contact with porous members; molding a lower crust sheet of dough while one of said porous members remains adherent thereto; placing a filler in said lower crust; applying thereon an upper crust sheet of dough, to form a complete pie, while one of said porous members remains in contact with said upper sheet of dough; separating said last mentioned porous members from said upper sheet of dough in advance of a trimming operation; and inverting the pie before baking the same in an inverted position.

6. A method of producing pies which comprises forming masses of crust dough into thin sheets in contact with porous members; molding a lower crust sheet of dough while one of said porous members remains adherent thereto; placing a filler in said lower crust member; applying thereon an upper crust sheet of dough, to form a complete pie, while one of said porous members remains in contact with said upper sheet of dough; separating said last mentioned porous member from said upper sheet of dough in advance of a trimming operation; stripping a remaining porous member therefrom; and baking the pie in an inverted position.

7. A method of producing sheets of dough suitable for use as pie crusts which includes placing a mass of said dough upon a textile fabric, and rolling said dough with a porous roller.

8. A method of producing sheets of dough suitable for use as pie crusts which includes placing a mass of said dough upon a textile fabric, rolling said dough with a porous roller, and admitting air under pressure through the pores in said roller during the rolling of said dough.

In testimony whereof, I have hereunto set my hand at Los Angeles, California, this 13th day of April, 1931.

ELIZABETH MOSS.